United States Patent
Carr (10) Patent No.: US 7,792,812 B1
(45) Date of Patent: Sep. 7, 2010

(54) SEARCH ENGINE DEVICES THAT SUPPORT HIGH SPEED PARALLEL DECODING OF DIGITAL SEARCH TRIES

(75) Inventor: David Walter Carr, Ontario (CA)

(73) Assignee: NetLogic Microsystems, Inc., Santa Clara, CA (US)

( * ) Notice: Subject to any disclaimer, the term of this patent is extended or adjusted under 35 U.S.C. 154(b) by 815 days.

(21) Appl. No.: 11/395,097

(22) Filed: Mar. 31, 2006

(51) Int. Cl.
*G06F 7/00* (2006.01)
*G06F 17/30* (2006.01)

(52) U.S. Cl. ........................................ 707/706; 707/764
(58) Field of Classification Search ................... None
See application file for complete search history.

(56) References Cited

U.S. PATENT DOCUMENTS

| | | |
|---|---|---|
| 4,606,002 A | 8/1986 | Waisman et al. |
| 4,677,550 A | 6/1987 | Ferguson |
| 5,430,869 A | 7/1995 | Ishak et al. |
| 5,446,887 A | 8/1995 | Berkowitz |
| 5,475,837 A | 12/1995 | Ishak et al. |
| 5,497,485 A | 3/1996 | Ferguson et al. |
| 5,560,007 A | 9/1996 | Thai |
| 5,644,763 A | 7/1997 | Roy |
| 5,758,356 A | 5/1998 | Hara et al. |
| 5,787,430 A | 7/1998 | Doeringer et al. |
| 5,813,000 A | 9/1998 | Furlani |
| 5,909,440 A | 6/1999 | Ferguson et al. |
| 6,532,457 B1 | 3/2003 | Tal et al. |
| 6,675,163 B1 * | 1/2004 | Bass et al. ...................... 707/6 |
| 2004/0199630 A1 * | 10/2004 | Sarkissian et al. ........... 709/224 |
| 2004/0243563 A1 * | 12/2004 | Heiner et al. .................. 707/3 |

OTHER PUBLICATIONS

"B-Trees: Balanced Tree Data Structures," http://www.bluerwhite.org/btree/, Admitted Prior Art, Printed, 8 pages, Apr. 29, 2004.
Demaine et al., "6.897: Advanced Data Structures, Lecture 4—Feb. 24, 2003, Fusion Trees," Spring 2003, pp. 1-8.
Ferguson, David "Bit-Tree; A Data Structure for Fast File Processing" *Communications of the ACM* 35(6) 114-120 (1992).
Fredman, M.L., "Blasting Through the Information Theoretic Barrier with Fusion Trees," Jrnl. of the ACM, 1990, pp. 1-7.
Knuth, Donald E. "Radix Searching" *The Art of Computer Programming*, Addison-Wesley Publishing Company, Inc. 245-258 (1975).
Lorion, Sebastien, "PATRICIA trie implementation," http://www.codeproject.com/csharp/partriciatrie.asp?print=true, May 29, 2003, 5 pages.

(Continued)

*Primary Examiner*—Charles Rones
*Assistant Examiner*—Harold A Hotelling
(74) *Attorney, Agent, or Firm*—Mahamedi Paradice Kreisman LLP; William L. Paradice, III (57) ABSTRACT

A search engine device that supports a Patricia trie arrangement of search keys includes an array of comparator cells that supports parallel decoding of the Patricia trie. This array of comparator cells processes a plurality of distinguishing bit identifiers for nodes in the Patricia trie in parallel with a corresponding plurality of bits of an applied search key during a search operation. In response to this processing, the array generates a match signal that identifies a location of a matching search key candidate within the Patricia trie.

6 Claims, 8 Drawing Sheets

OTHER PUBLICATIONS

McGill University: School of Computer Science, Winter 1997 Class Notes for 308-251, Data Structures and Algorithms, Topic #7: Tries and Suffix Trees, 14 pages.

Michael Mitzenmacher, http://www.eecs.harvard.edu/~michaelm/NEWWORK/papers/html, Jun. 22, 2004, 8 pages.

Morrison, D.R., "PATRICIA-Practical Algorithm to Retrieve Information Coded In Alphaumeric," Jrnl. of the ACM, 15(4), Oct. 1968, pp. 514-534.

O'Connor et al., "The Iflow Address Processor," Silicon Access Networks, San Jose, CA, IEEE, 2001, pp. 16-23.

Reyes, R., "Optimized IP to ISO3166 Country Code Mapping in C#," http://www.codeproject.com/csharp/iptocountry.asp?print=true, February 13, 2003, 6 pages.

Sedgewick, Robert "6.3 Digital Searching" *Algorithms in C*, Addison-Wesley Publishing Company 481-505 (1990).

Morrison, D. R., "PATRICIA—Practical Algorithm to Retrieve Information Coded in Alphanumeric," Sandia Laboratory, Journal of the Association for Computing Machinery, vol. 15, No. 4, Oct. 1968, pp. 514-534.

Tardos, S. E., p. 384 from Proceedings of the Seventh Annual ACM-SIAM Symposium on Discrete Algorithms, held Jan. 28-30, 1996 in Atlanta, Georgia.

* cited by examiner

SEARCH ENGINE DEVICES THAT SUPPORT HIGH SPEED PARALLEL DECODING OF DIGITAL SEARCH TRIES

TECHNICAL FIELD

The disclosure herein relates to integrated circuit devices and, more particularly, to search engine devices.

BACKGROUND

Figure 1A:
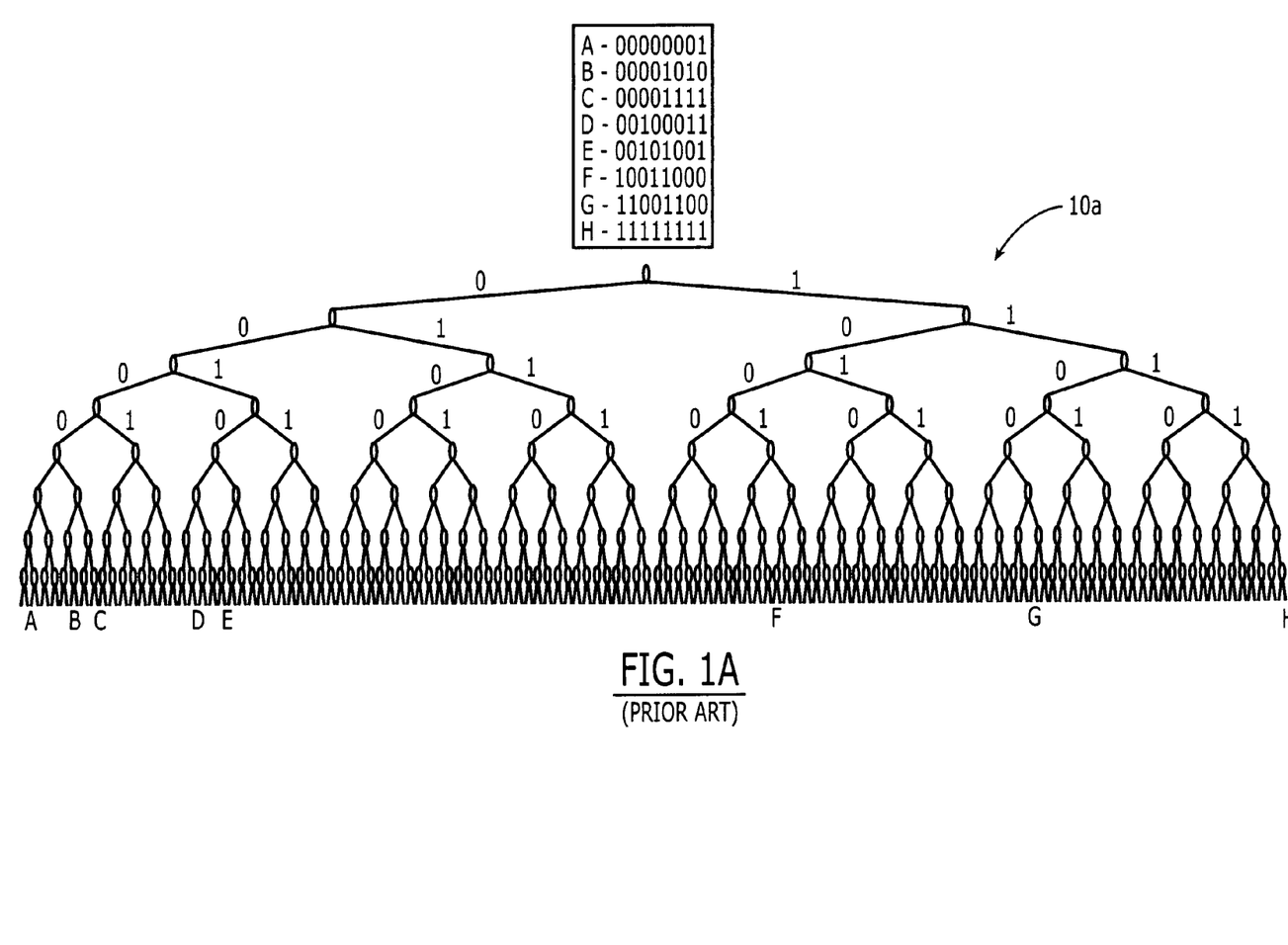
FIG. 1A illustrates a conventional digital search trie that has been updated with eight 8-bit search keys A-H.
Figure 1B:
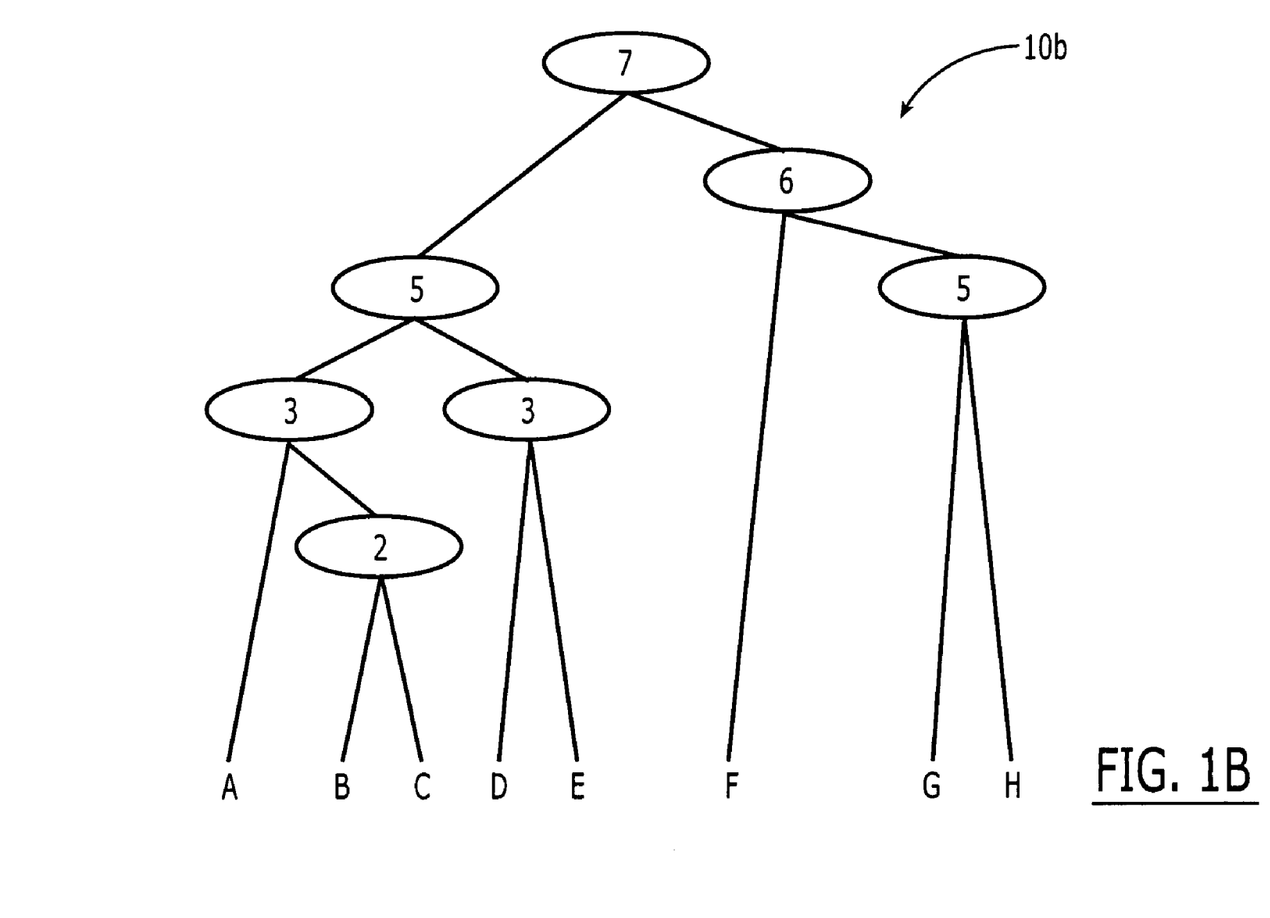
FIG. 1B illustrates a conventional Patricia trie that is achieved by removing all unary branches from the digital search trie of FIG. 1A.

A path-compressed digital search trie (DST) that supports branching decisions based on single binary digits is often referred to as a Patricia trie. FIG. 1A illustrates a conventional digital search trie 10a that supports eight 8-bit search keys A-H and FIG. 1B illustrates a conventional Patricia trie 10b that is achieved by removing all unary branches from the trie 10a and labeling all remaining nodes with the distinguishing bit positions from the search keys A-H. Conventional search techniques include using selected bits from an applied search key to traverse the trie 10b and locate a result by a process of elimination.

Figure 2A:
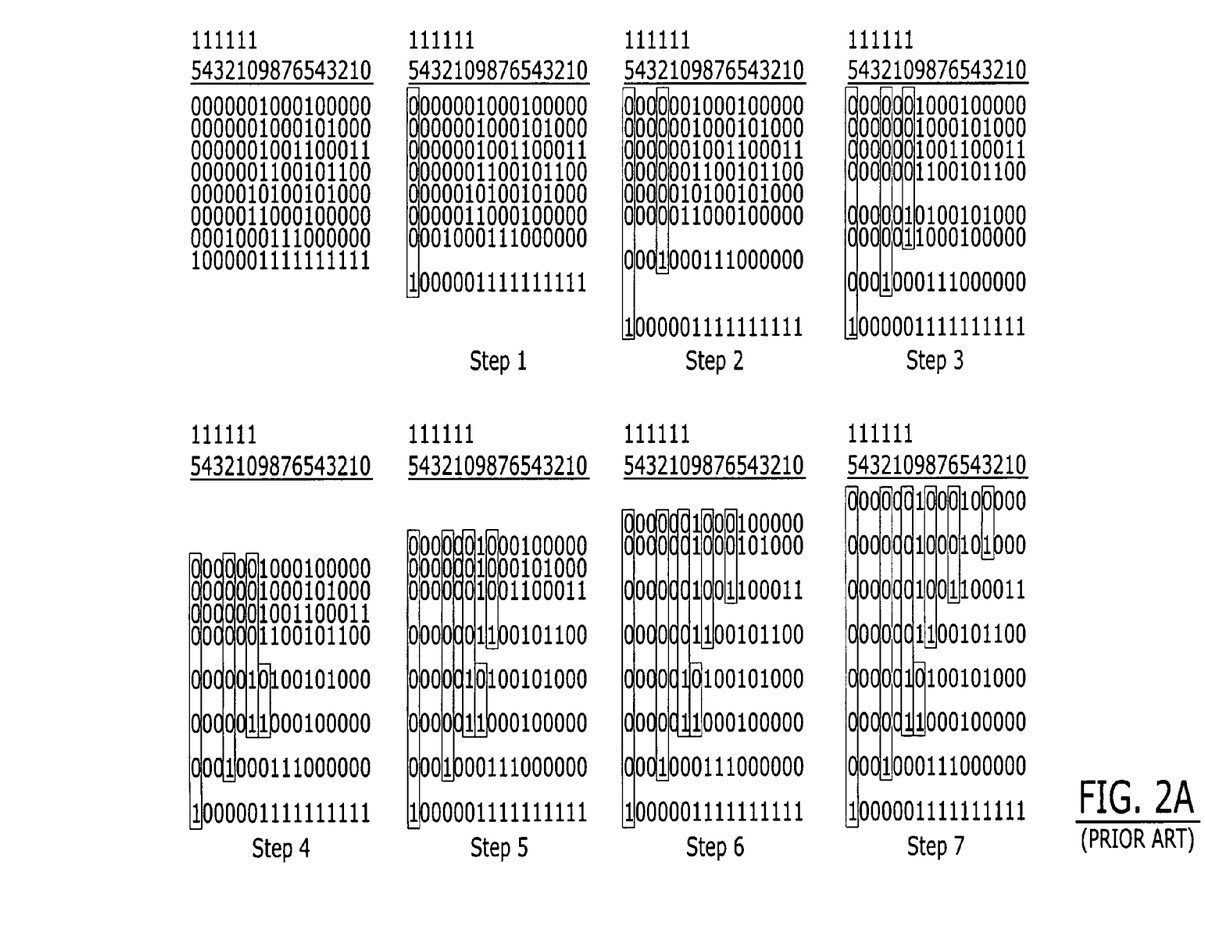
FIGS. 2A-2C illustrate conventional steps to construct and update Patricia tries containing search keys.
Figure 2B:
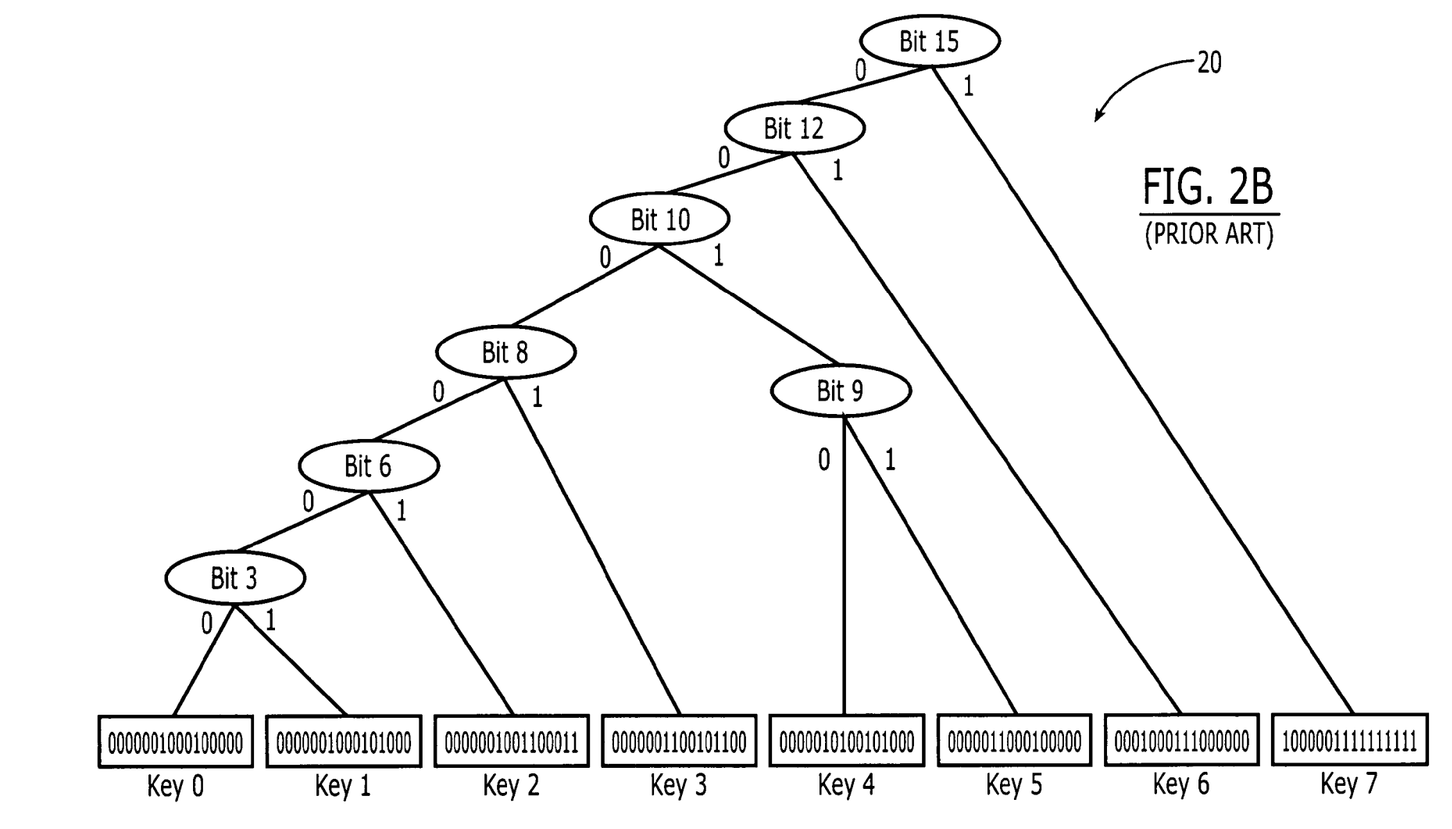

FIGS. 2A-2B illustrate conventional multiple steps used to construct a Patricia trie 20 that supports N=8 keys of size W=16-bits. These eight keys are illustrated in the top left corner of FIG. 2A. In step 1, the leftmost bit (bit 15) is identified as a bit that can split the set of eight keys into two groups. The first group includes a single key (key 7), which has a leftmost bit equal to 1, and the second group includes the seven remaining keys having leftmost bits equal to 0. In step 2, the seven keys in the second group can be further split into a group of six keys and a group of one key based on the $12^{th}$ bit. In step 3, the group of six keys identified in step 2 can be split into a group of two keys and a group of four keys based on the $10^{th}$ bit. In step 4, the group of two keys identified in step 3 can be further split into two groups of one key each (keys 4 and 5), based on the $9^{th}$ bit. In step 5, the group of four keys identified in step 3 can be split into a group of one key and a group of three keys based on the $8^{th}$ bit. In step 6, the group of three keys identified in step 5 can be split into a group of two keys and a group of one key based on the $6^{th}$ bit. Finally, in step 7, the group of two keys identified in step 6 is evenly split based on the $3^{rd}$ bit. Thus, as illustrated by FIG. 2B, the nodes of the Patricia trie are labeled with the distinguishing bit positions (e.g., bits 15, 12, 10, 9, 8, 6 and 3). In particular, the trie 20 consists of nodes that identify a set of bit positions that are examined in an applied search key, and left and right branches (pointers) to follow based on the value of each examined bit.

As will be understood by those skilled in the art, the construction of the trie 20 requires $\log_2 W$ bits to encode each bit position, $\log_2 N$ bits to encode each of the left or right pointers and a bit to indicate whether a branch leads to another intermediate node or a leaf node. There are always N−1 branch nodes in a trie with N keys. Moreover, for N<W, all N−1 nodes must be visited in the worst case (skewed). For N>W, the number of nodes traversed is bounded by W (i.e., examine all bits in an applied key). In the best case, which occurs when the search trie is balanced, only $\log_2 N$ nodes are visited.

Searching the Patricia trie 20 of FIG. 2B using distinguishing bit values extracted from the applied search key results in the identification of a candidate key in a leaf node (or possibly pointed to by the leaf node) that may (or may not) exactly match the applied search key. To determine whether an exact match is present, the candidate key must be compared to the applied search key. For example, searching the trie 20 with an applied search key equal to 0001000111000000 will terminate at the leaf node containing key 6, which represents an exact match. However, searching the same trie 20 with a key equal to 0111111000111111 will also terminate at the leaf node containing key 6, but this key clearly does not match the applied search key.

In order to modify the trie 20 with the insertion of a new key, it is necessary to find a predecessor key (i.e., a key in the trie with the highest ordinal value less than the new key) or a successor key (i.e., a key in the trie with the lowest ordinal value greater than the new key). This may be accomplished by finding where a distinguishing bit is missing that would have led to the new key had the new key been present in the trie. One conventional technique to find the distinguishing bit includes finding a longest common prefix (LCP) between the new key (S) and a candidate key (K) and adjusting all bits following the LCP. A new pseudo-key P may be created consisting of the concatenation of the LCP and a string of all 0's or 1's, depending on whether the bit following the LOP in the new key is a 0 or 1. For example, if the new key (S) equals 0110100011000001, then a search of the trie 20 results in an identification of key 2 (0000001001100011) as the candidate key, which does not equal to the new key. The LOP between the new key and the candidate key (key 2) is LCP=0*************. This LCP value indicates that the first distinguishing bit should have been bit 14 of the new key S, which equals 1. The pseudo-key is therefore P=0111111111111111. Performing a search of the trie 20 using the pseudo-key P results in an identification of key 6. Because bit 14 of the new key S is 1, key 6 must be a predecessor of the new key S. This confirms the following relationship: key 6<new key S<key 7. Based on this relationship, the new key S is identified as key 7 and original key 7 is renumbered as key 8 in the conventional trie 20' in FIG. 2C.

SUMMARY

Embodiments disclosed herein include search engine devices configured to support Patricia tries of search keys. According to some of these embodiments, a search engine device includes an array of comparator cells. This array is configured to support a search operation by processing a plurality of distinguishing bit identifiers for nodes in a Patricia trie in parallel with a corresponding plurality of bits of an applied search key. In response to this processing, a match signal is generated that identifies a location of a matching search key candidate within the Patricia trie.

In some embodiments, the array of comparator cells includes cells that are configured to perform a comparison between two of the distinguishing bit identifiers. The array also includes diagonal and non-diagonal cells of different configuration. A priority encoder and a search key memory are also provided. The priority encoder is configured to generate a match index in response to the match signal and the search key memory is configured to generate the matching search key candidate in response to the match index. An exact match determination is made using a comparator that is configured to compare the matching search key candidate against the applied search key.

Still further embodiments include a search engine device having a match circuit and a search key memory therein. The match circuit is configured to support parallel decoding of a Patricia trie of search keys and the search key memory is configured to store search keys (and possibly corresponding key indexes) that are accessible using a result generated from the parallel decoding of the Patricia trie by the match circuit. The search engine device may also include a tree node memory, which is configured to store distinguishing bit identifiers for nodes in the Patricia tree. According to these embodiments, the search engine device performs the operations of decoding a plurality of distinguishing bit identifiers for nodes in a Patricia trie in parallel with a corresponding plurality of bits of an applied search key during a search operation and generating a match signal that identifies a location of a matching search key candidate within the Patricia trie.

DETAILED DESCRIPTION OF PREFERRED EMBODIMENTS

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters.

Figure 2C:
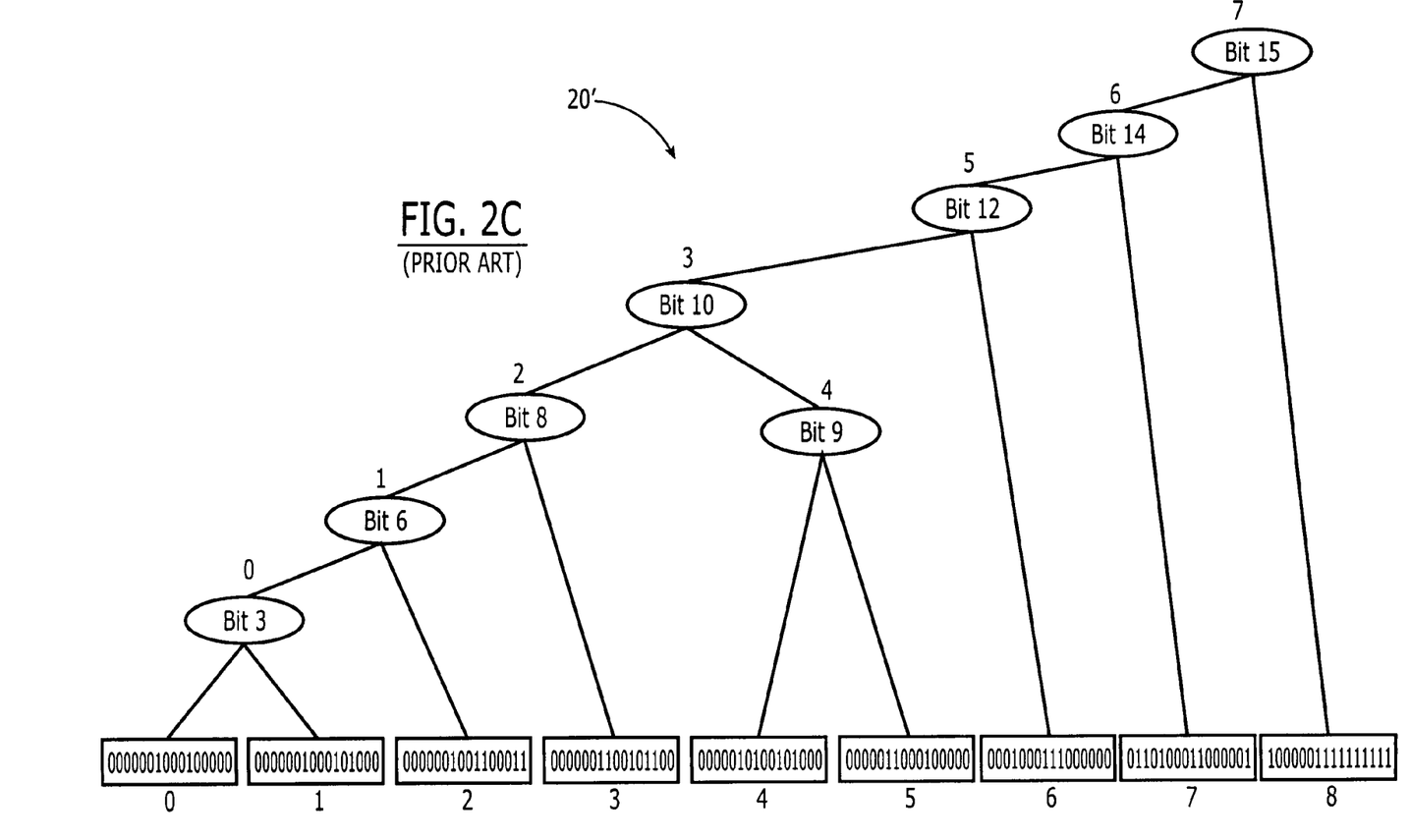
Figure 3:
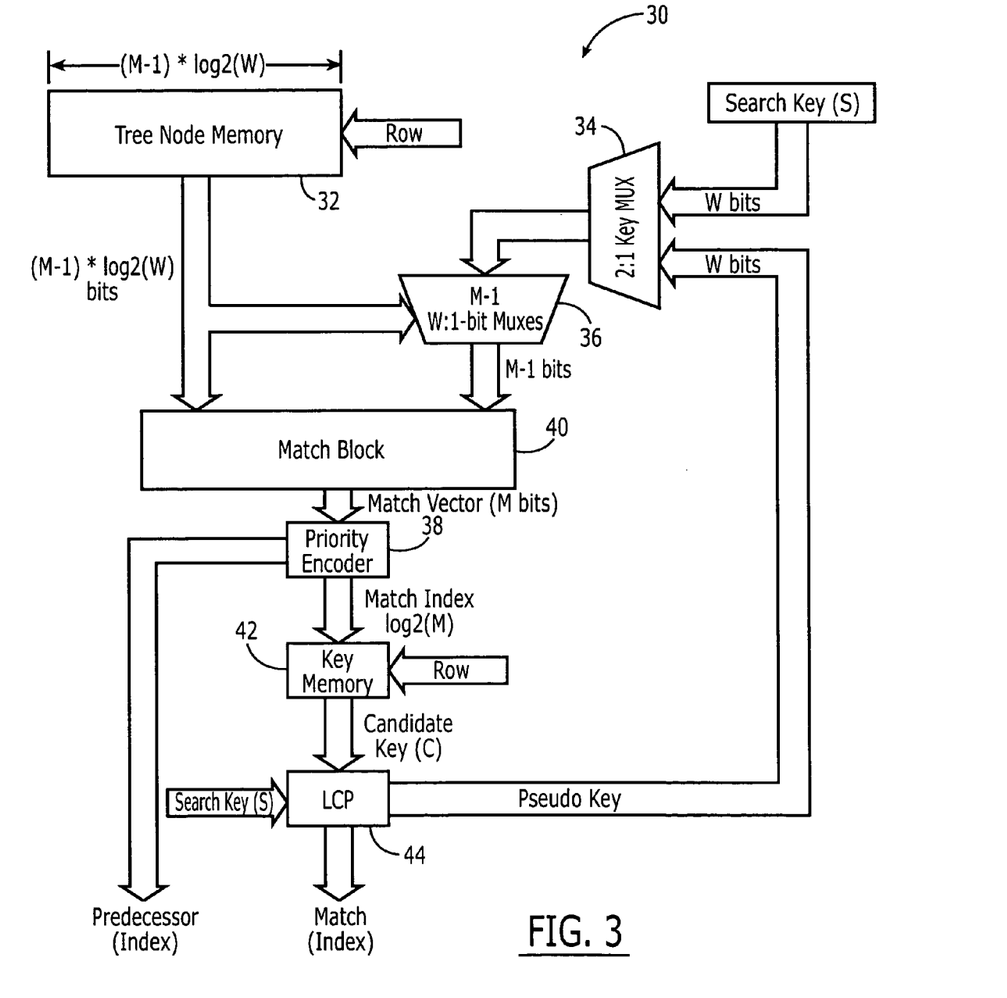
FIG. 3 is a block diagram of a search engine device having hardware therein configured to enable parallel decoding of a Patricia trie, according to embodiments of the present invention.

FIG. 3 illustrates a block diagram of a search engine device 30 that supports a plurality of Patricia trie databases. The search engine device 30 includes a tree node memory 32 having a plurality of rows of memory cells therein. This tree node memory 32 is responsive to a row address (ROW), which specifies the location (e.g., memory row) of the distinguishing bit positions for a selected database (or portion of a database) of search keys, which is arranged as a Patricia trie. In particular, each row of the tree node memory 32 is illustrated as having a width equal to: $(M-1) \times \log_2 W$, where the value M−1 designates the number of nodes within the selected trie and W designates the width of the search keys supported by the tree. Using the trie 20' of FIG. 2C as an example, the output of the tree node memory 32 in response to a read operation equals 8×4=32 bits, with each of the eight 4-bit groupings designating a value of a distinguishing bit corresponding to a node within the trie 20'. Thus, node 0 within the trie 20' would be represented by its distinguishing bit equal to 3 (i.e., 0011) and node 1 would be represented by its distinguishing bit equal to 6 (i.e., 0110). The remaining nodes 2-7 would be similarly designated.

An applied search key (S) of W bits is provided to a 2:1 routing multiplexer 34. The output of the multiplexer 34 is forwarded to a bank of W:1-bit multiplexers 36. This bank, which is shown as having a size equal to M−1, receives the output of the tree node memory 32 as a control signal (i.e., multiplexer select signal). Based on this configuration, the bank of multiplexers 36 selects M−1 distinguishing bits from an applied search key (S). Using the trie 20' of FIG. 2C again as an example, the bank of multiplexers 36 would select the following distinguishing bits: 3, 6, 8, 9, 10, 12, 14 and 15, from the applied search key (S) when performing a search operation. These M−1 distinguishing bits and the output of the tree node memory 32 are provided in parallel as inputs to a match block 40. As described more fully hereinbelow with respect to FIGS. 4A-4C, the match block 40 includes an array of comparator cells. This array is configured to process a plurality of distinguishing bit identifiers for nodes in a Patricia trie (e.g., the row output of the tree node memory 32) in parallel with a corresponding plurality of M−1 distinguishing bits of an applied search key during each search operation.

This processing results in the generation of a match signal that identifies a location of a matching search key candidate within the Patricia trie. This candidate represents a possible "match" to the applied search key. This match signal is illustrated as a M-bit match vector (with one bit set), which is provided to a priority encoder 38. This priority encoder 38 encodes the match signal into a match index by finding the ordinal position of the single set bit in the match signal, for example. This match index is provided as a row address offset, which is combined with the row address (ROW) (designating a particular database) to access a key memory 42. This access of the key memory 42 results in the generation of a candidate key (C) corresponding to the bit set within the M-bit match vector. The access of the key memory 42 may also result in the generation of additional data (e.g., associated data, which may include a key index, etc.) stored with the candidate key.

The candidate key C and the applied search key S are then compared to determine whether the candidate key C matches the applied search key S. This comparison is performed in a longest common prefix (LCP) determination circuit 44, which determines a number of matching leading bits between the candidate key C and the applied search key S. When the number of matching leading bits is equivalent to W, then the search is complete and a matching index, which was returned with the candidate key during a read of the key memory 42, is output from the search engine device 30.

However, if the comparison performed by the LCP determination circuit 44 identifies a mismatch, then a pseudo key P is generated in order to support operations to insert the applied search key S into the Patricia trie. This pseudo key is generated as the longest common prefix identified by the LCP determination circuit 44 concatenated with a string of bits equal to the W-nth bit in the applied search key S, where n equals the length of the longest common prefix between the applied search key S and the candidate key C. After generation by the LCP determination circuit, the pseudo key P is passed through the 2:1 routing multiplexer 34 to the W:1-bit multiplexers 36. The M−1 distinguishing bits (e.g., bits 3, 6, 8, 9, 10, 12, 14 and 15) within the pseudo key P are then passed to the match block 40 in order to identify a location of a matching key. The match vector generated by the match block 40 is then passed to the priority encoder 38, which is illustrated as generating a predecessor/successor index. This index specifies a location of a predecessor of the original applied search key S for the case where the W-nth bit appended to pseudokey is 1 or a location of a successor of the original applied search key S for the case where the W-nth bit appended to the pseudokey is 0. This predecessor index is then used to specify the location to which the applied search key S is to be inserted into the Patricia trie during a learn operation.

Figure 4A:
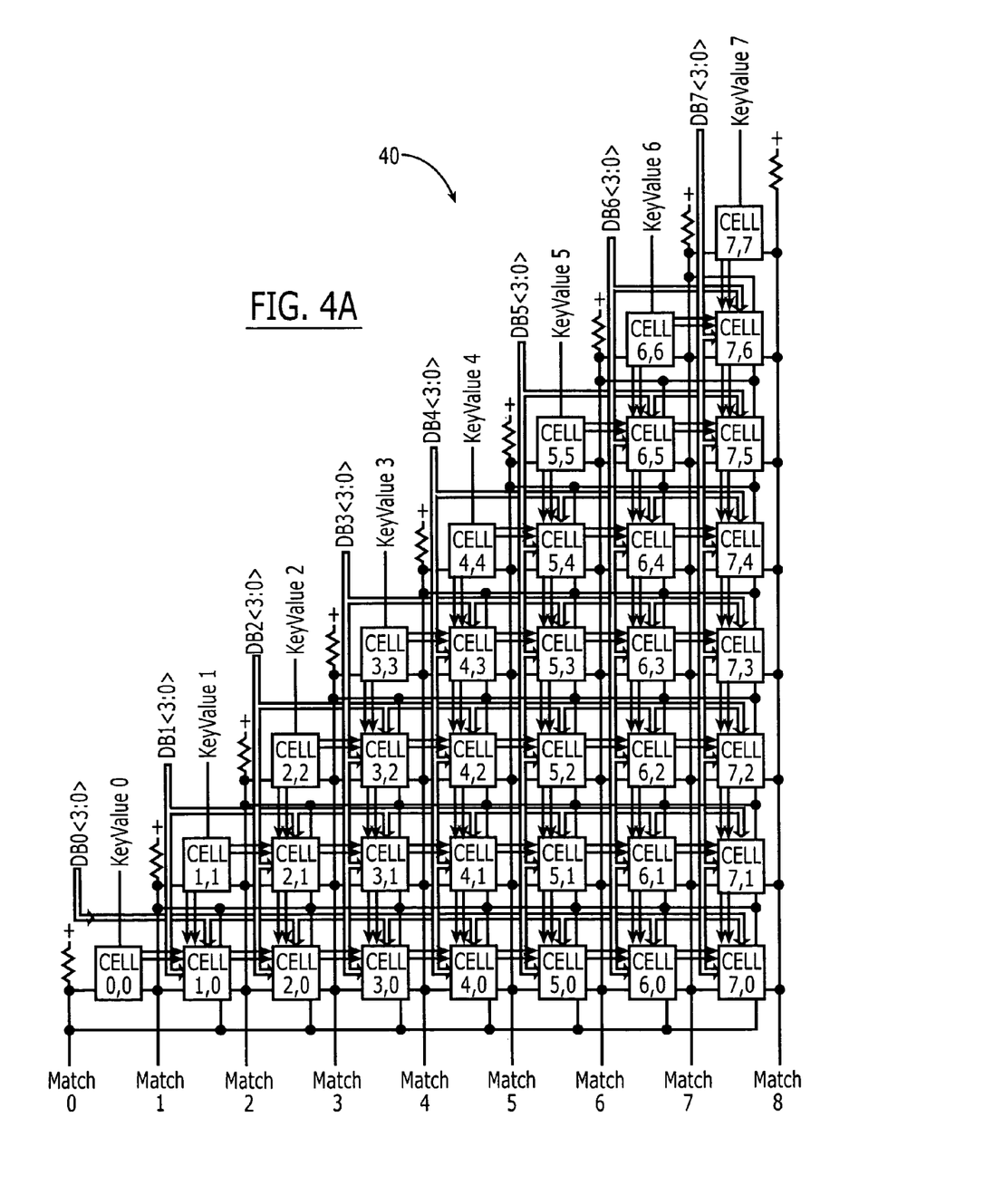
FIG. 4A is a block diagram of a comparator array that may be used in the search engine device of FIG. 3, according to embodiments of the present invention.
Figure 4B:
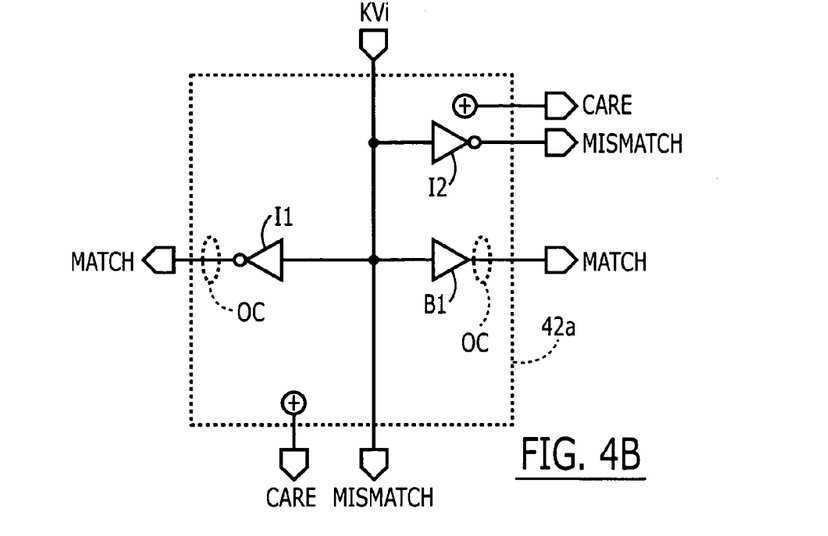
FIG. 4B is an electrical schematic of a diagonal comparator cell illustrated in FIG. 4A.
Figure 4C:
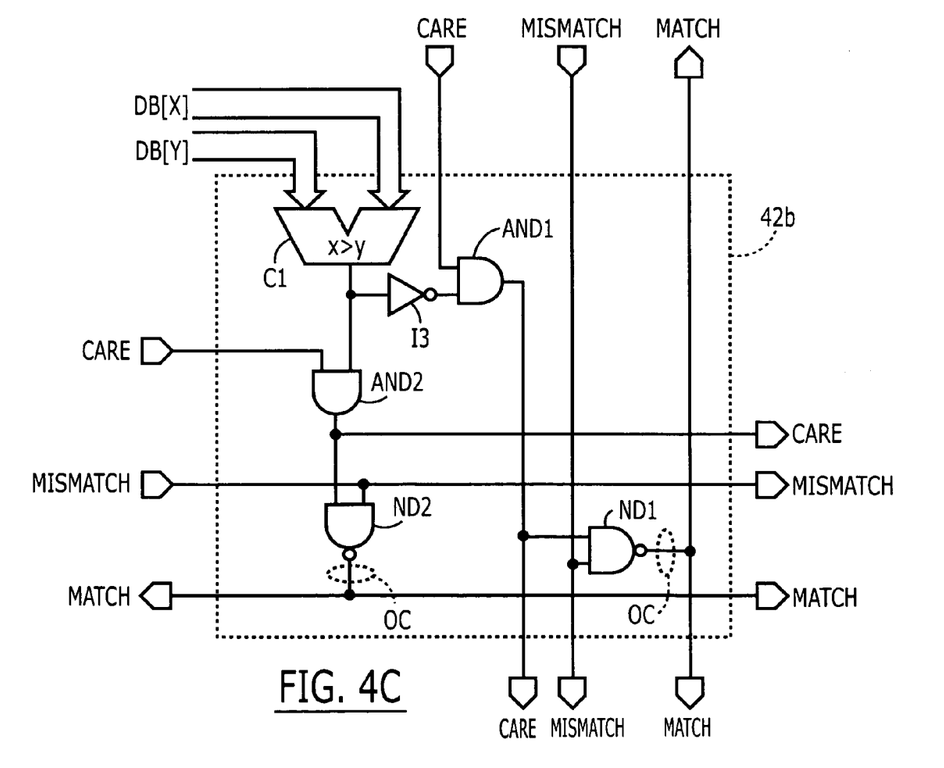
FIG. 4C is an electrical schematic of a non-diagonal comparator cell illustrated in FIG. 4A.

FIGS. 4A-4C illustrate a match block 40 according to embodiments of the present invention, which includes a folded array of comparator cells (42a and 42b). This exemplary array, which includes both diagonal cells 42a (cells (0,0), (1,1), (2,2), . . . (7,7)) and non-diagonal cells 42b (cells (1,0), (2,0), (3,0), . . . (7,0), (2,1), (3,1), . . . , (7,6)), is illustrated as supporting a small trie having eight nodes and nine leaves representing the nine stored keys. The size of this array varies with the capacity of the Patricia trie used in a particular application. This match block 40 is illustrated as being responsive to a plurality of distinguishing bit identifiers, which are provided by the tree node memory 32, and a corresponding M−1 bits of an applied search key (KeyValue0-KeyValue7) or pseudo key, which are selected by the bank of multiplexers 36. These distinguishing bit identifiers are illustrated as 4-bit identifiers: DB0<3:0>, DB1<3:0>, DB7<3:0>, for the case where the Patricia trie has eight nodes (see, e.g., FIG. 2C) and W=16. In response to these inputs, the match block 40 generates a multi-bit match signal (MATCH0-MATCH8) having a single set bit (i.e., single bit remaining at logic 1 level). This match signal identifies a location of a matching search key candidate within the selected Patricia trie.

The compare operations begin with the diagonal cells and proceed downward and to the right across the array. In particular, the diagonal cells 42a generate logic 1 CARE signals (i.e., CARE=Vdd), which extend downward and to the right across the array, in addition to MATCH and MISMATCH signals. These logic 1 CARE signals indicate the cells located below and to the right of the corresponding diagonal cell are to participate in a matching operation. The diagonal cells 42a eliminate many keys from the search path because whenever a KVi value equals 0, then the MATCH line to the right of the diagonal cell will be pulled low thereby eliminating a key. Alternatively, whenever the KVi value equals 1, the match line to the left of the diagonal cell receiving the KVi value will be pulled low to eliminate another key.

The horizontal MISMATCH signal is generated by an inverter I2, which receives a corresponding key value (KeyValue=KV) as an input signal. This key value is also provided as vertical MISMATCH signal. A non-inverting buffer B1 (with open collector (OC) configuration) generates a right MATCH signal and an inverting buffer I1 (with open collector (OC) configuration) generates a left MATCH signal. As illustrated best by FIG. 4A, the MATCH signals are weakly held at logic 1 values (i.e., precharged) by a pull-up resistor network that is connected to a power supply voltage (shown as "+"). During a search operation, all but one (or possibly all) of these weak logic 1 values is pulled low by operation of the cells 42a and 42b within the folded array.

The non-diagonal cells 42b are illustrated as including a log₂W comparator C1, which generates a logic 1 output signal when DB[X] is greater than DB[Y] and a logic 0 output signal when DB[X] is less than DB[Y]. This output signal is passed through an inverter I3 to an input of a first AND gate AND1. The output signal from the comparator C1 is also passed directly to an input of a second AND gate AND2. Vertical and horizontal CARE signals are also provided to inputs of the first and second AND gates AND1, as illustrated. The CARE signals generated by the first and second AND gates are provided to first and second NAND gates (ND1 and ND2), which have an open collector (OC) output configuration. These first and second NAND gates ND1 and ND2 are also responsive to vertical and horizontal MISMATCH signals. The output terminals of the first and second NAND gates ND1 and ND2 are connected to a vertical MATCH line and a horizontal MATCH line, respectively.

Operations of the match block 40 and the folded array of comparator cells 42a and 42b therein will now be described using a search example as applied to the Patricia trie 20' of FIG. 2C. In this example, an applied search key S<15:0> equal to 1000001111111111 will result in the generation of a M−1 bit key value equal to: KeyValue<0:7>=KV<0:7>=11101001 for the following distinguishing bits: DB0<3:0>=3=(0011), DB1<3:0>=6 (0110), DB2<3:0>=8 (1000), DB3<3:0>=10 (1010), DB4<3:0>=9 (1001), DB5<3:0>=12 (1100), DB6<3:0>=14 (1110) and DB7<3:0>=15 (1111). Applying these values to the folded array of FIG. 4A will cause the diagonal cells (0,0), (1,1), (2,2), (4,4), and (7,7) to pull down the match line to the left of their cells, match 0, 1, 2, 6, and 7 since the KV input to these cells is 1. Similarly, diagonal cells (3,3), (5,5) and (6,6) pull the match lines to their right down, namely match lines 4, 6, and 7. This process alone eliminates 6 of the 9 possible matching candidates. Moreover, the above specified values will also cause the comparator C1 in the non-diagonal cell (4,3) to generate a logic 1 voltage at its output (because DB3<3:0>=10 (1010) is greater than DB4<3:0>=9 (1001). This generation of a logic 1 voltage will cause the first AND gate AND1 to block vertical transfer of a logic 1 CARE signal through the cell (4,3) and cause the second AND gate AND2 to pass a horizontal CARE signal through the cell (4,3). In addition, the application of these distinguishing bit and key values to the folded array of FIG. 4A will cause the comparator C1 in all non-diagonal cells, except cell (4,3), to generate a logic 0 voltage at its output. This generation of a logic 0 voltage will cause the first AND gate AND1 to enable vertical transfer of CARE signals through these non-diagonal cells and cause the second AND gate AND2 to block transfer of horizontal CARE signals across these cells. Based on these operations and the generation of the MATCH and MISMATCH signals derived from the following key values: KeyValue<0:7>=KV<0:7>=11101001, a 9-bit match signal MATCH<0:8> equal to 000000001 will be generated.

Referring again to FIG. 3, this match signal MATCH<0:8> equal to 000000001 is passed to the priority encoder 38, which converts the match signal to a 4-bit match index. For this example, the match index is set to 8 (i.e., 1000). This match index and row address (ROW), which designates a starting row address for the trie 20' illustrated by FIG. 2C, are combined to result in the generation of a candidate key C equal to: 1000011111111111 and the generation of a corresponding key index (and possibly additional associated data) from the key memory 42. This candidate key is illustrated as Key 8 in FIG. 2C.

This candidate key C and the applied search key S are then compared to determine whether the candidate key C matches the applied search key S. This comparison is performed in the longest common prefix (LCP) determination circuit 44. In particular, a length vector L is generated by determining whether a bit-to-bit equivalency is present between the candidate key C and the applied search key S. Because a bit-to-bit equivalency does exist in this example, the LCP determination circuit 44 outputs the key index associated with the matching key.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A search engine device, comprising:

an array of comparator cells configured to process a first plurality of nodes of a Patricia trie in parallel during a search operation by evaluating at the same time, all of a first plurality of distinguishing bit identifiers associated with respective ones of the first plurality of nodes of the Patricia trie in parallel with each other and in parallel with a corresponding second plurality of bits of an applied search key, to thereby generate a match signal that identifies a location of a matching search key candidate within the Patricia trie; and a priority encoder configured to generate a match index in response to the match signal.

2. The device of claim 1, wherein said array of comparator cells comprises a plurality of comparator cells that are each configured to perform a comparison between two of the distinguishing bit identifiers.

3. The device of claim 1, wherein said array of comparator cells comprises diagonal and non-diagonal cells of different configuration.

4. The device of claim 3, wherein each of the non-diagonal cells is configured to perform a comparison between two of the distinguishing bit identifiers.

5. The device of claim 1, further comprising a search key memory configured to generate the matching search key candidate in response to the match index.

6. The device of claim 5, further comprising a comparator configured to compare the matching search key candidate against the applied search key.

* * * * *